Sept. 3, 1929.  J. R. BAYLIS  1,727,094
TUNGSTEN ELECTRODE FOR DETERMINING ION CONCENTRATION
Filed July 16, 1924
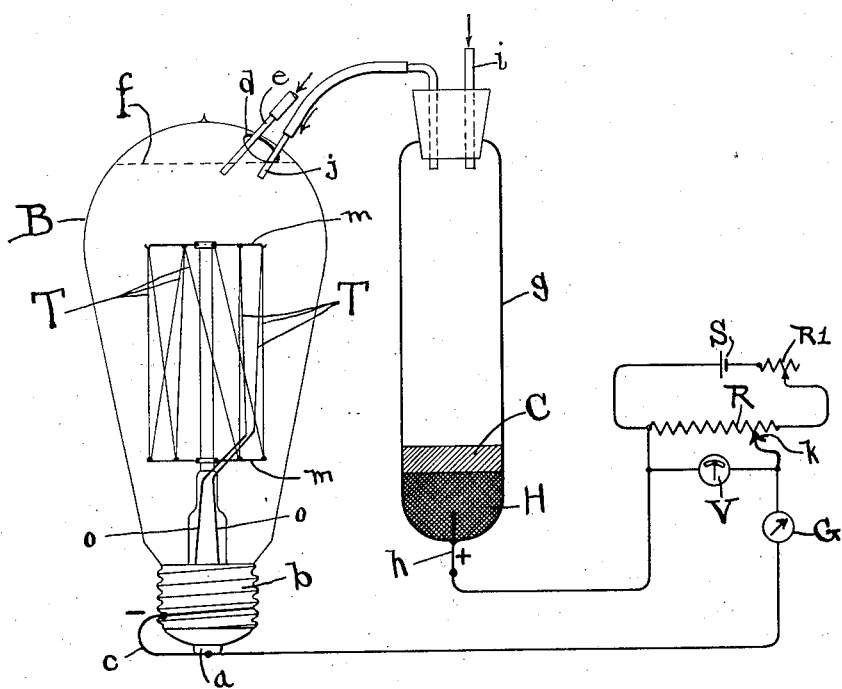
INVENTOR
John R. Baylis
BY Cornelius D. Ehret
his ATTORNEY Patented Sept. 3, 1929.

1,727,094

UNITED STATES PATENT OFFICE.

JOHN R. BAYLIS, OF BALTIMORE, MARYLAND, ASSIGNOR TO LEEDS & NORTHRUP COMPANY, OF PHILADELPHIA, PENNSYLVANIA, A CORPORATION OF PENNSYLVANIA.

TUNGSTEN ELECTRODE FOR DETERMINING ION CONCENTRATION.

Application filed July 16, 1924. Serial No. 726,320.

My invention relates to the measurement or determination of selected ions, such as hydrogen or hydroxyl ions, in solutions or electrolytes, and in general to the utilization for any purpose of the electro-motive-force dependent upon or representative of concentrations of selected ions.

In accordance with my invention, there is utilized an electrode of tungsten immersed in or otherwise suitably in contact with the solution whose hydrogen or hydroxyl ion concentration is to be measured, determined or utilized and which, in association with a suitable half cell, effects potential differences characteristic or representative of the hydrogen or hydroxyl ion concentration of the solution.

For an understanding of my invention and for an illustration of one of the various forms it may take, reference is to be had to the accompanying drawing, which is in part a side elevational view of apparatus utilizable and in part a circuit diagram.

Many liquors or solutions, and most industrial liquors or solutions, are in more or less continuous contact with the air. It is well known that a metallic electrode in contact with such liquor or solution will give a rough indication of the hydrogen or hydroxyl ion concentration in the liquor or solution, or will at least effect changes in potential in response to changes in the hydrogen or hydroxyl ion concentration.

I have found that such metallic electrodes utilized with liquors or solutions of the character referred to are in general unsuitable for the determination of hydrogen or hydroxyl ion concentrations. This is due to the fact that the potentials effected by such metallic electrodes will in most cases depend very particularly upon the nature or condition of the surface of the metal, its previous history, treatment, etc. Such metallic electrodes are also apparently irreversible, in the sense that when polarized slightly they do not return to their previous condition or potential.

The catalytic activity of the metal also has apparently a great influence upon its applicability for measuring hydrogen ion concentrations. For example, it was found that platinized platinum was better than bare or unplatinized platinum, due probably to the fact that platinized platinum has greater capacity of absorbing oxygen ions from the solution, and thus functioning like an oxygen electrode, the oxygen ions in the solution being due at least in part to the oxygen absorbed from the air because of contact of the solution therewith.

Tungsten exhibits well known catalytic activity, which I believe is one of its properties particularly suitable for the purposes herein described. I have found tungsten more satisfactory than any other metal which I have employed or tested. When polarized, tungsten successfully returns to equilibrium, and the potential effected thereby is only to small extent dependent upon the previous history of the metal. It has one great advantage over even the well known hydrogen electrode, comprising a metal electrode against or around which hydrogen gas is continuously delivered, in that tungsten effects a voltage change of approximately .09 volt for each pH as against approximately .06 volt for the hydrogen electrode, and in consequence the measurements or determinations of hydrogen or hydroxyl ion concentration are with greater ease effected with a tungsten electrode because of the higher potential differences effected thereby for the same hydrogen or hydroxyl ion concentrations. A tungsten electrode thus has advantages both in the matter of larger potentials, successful return to equilibrium, and has been found to have practical independence of previous history of the metal.

The electrode may partake of any suitable form or arrangement. In the example herein illustrated, however, it takes the form of a filament or wire, such, for example as the tugnsten filament of an electric incandescent lamp. Tungsten electric lamp filaments are of advantage in that they are already provided with convenient mounting, and are of uniform structure, composition and past history. Furthermore, the condition of the metallic surfaces of filaments of or from different lamps appears quite uniform, and in consequence the results obtainable by filaments from different lamps are to all intents and purposes the same. It shall be understood, however, that my invention is not limited to tungsten in the form of wire or filaments, nor to filaments of or from incandescent lamps, but comprehends the material tungsten broadly and tungsten in the form of a sheet or plate, grid, gauze and the like.

Referring to the drawing, T represents the tungsten filament of, for example, a 40 watt Mazda incandescent lamp having within the bulb B a suitable structure for supporting and mounting the filament T whose terminals connect with the external button contact $a$ and the threaded shell contact $b$. Either of the contacts $a$ or $b$ may alone be used for connecting the electrode T in circuit, or, as indicated, they may be connected to each other by a conductor $c$, whereby the filament T is in effect a closed loop. Through the bulb B is ground a hole $d$, through which is introduced through the tube $e$ the electrolyte or solution whose ion concentration is to be measured, determined or utilized, the solution taking a level $f$ and overflowing the lower edge of the aperture $d$ to the exterior of the bulb B.

In some of my uses of the tungsten wire T it was removed from the supporting wires $m$ and bathed in the solution, whose hydrogen ion concentration was being examined, entirely free from any other metal. It was found, however, that the lead-in wires $o$ and supporting wires $m$ had no troublesome influence on the potential obtained.

The liquid introduced through the tube may be drinking water from any source, as a municipal water supply, or may be any other industrial or other liquid whose ion concentration is to be determined or utilized. Accordingly, the tungsten electrode T is immersed in, and in general in contact with, the solution whose ion concentration is under investigation.

In association there is utilized any suitable half cell. In the example illustrated, it is a calomel half cell comprising the vessel $g$ containing in its bottom a puddle of mercury H, upon which is a layer of calomel C. Sealed through the wall of the glass vessel $g$ is a wire $h$ connecting with the mercury H. Through the tube $i$ is continuously introduced at suitable rate any suitable solution, such, for example, as potassium chloride of suitable concentration, the same passing out through the tube $j$ extending below the electrolyte level $f$, the tube $j$ forming a capillary or otherwise suitably restricted passage for effecting small area of liquid junction.

The complete cell may be used in any suitable circuit arrangement. In the example illustrated, it is utilized in connection with the potentiometer comprising the battery or source of current S delivering current through the resistance R and rheostat $R^1$. The terminal $h$ is connected to one terminal of the resistance R, and the tungsten electrode T is connected through the galvanometer G with the contact $k$ movable along the resistance R.

The strength of current passing from the source S through the resistance R is adjusted to suitable value by the variable resistance $R^1$. By moving the contact $k$ along the resistance R to such point thereon that the deflection of the galvanometer G is nil, the total potential difference produced by the complete cell is readable upon the indicating or direct reading voltmeter V, whose readings will vary with variations in hydrogen or hydroxyl ion concentration of liquid introduced through the tube $e$.

In the appended claims the term "hydrogen" is employed in a generic sense to include hydrogen, hydroxyl and such other ions to the determination or the utilization of whose concentration my invention is applicable.

What I claim is:

1. Apparatus for determining or utilizing hydrogen ion concentration comprising a vessel containing the solution the concentration of whose hydrogen ions is to be determined or utilized, a support therein, and a tungsten filament carried by said support.

2. Apparatus for determining or utilizing hydrogen ion concentration comprising an incandescent lamp having a tungsten filament, means for delivering into the bulb of said lamp the solution the concentration of whose hydrogen ions is to be determined or utilized, and a circuit connection with a terminal of said lamp.

3. Apparatus for determining or utilizing hydrogen ion concentration comprising an incandescent lamp having a tungsten filament, means for delivering into the bulb of said lamp the solution the concentration of whose hydrogen ions is to be determined or utilized, and a circuit connection with both terminals of said lamp.

4. Electrode structure for determining or utilizing hydrogen ion concentrations comprising a metal filament-supporting structure, and a tungsten wire carried upon said supporting structure.

5. Means for determining or utilizing hydrogen ion concentrations comprising a lamp bulb, filament-supporting structure therein, a tungsten wire carried by said supporting structure, a lead-in wire connecting with said tungsten wire, a terminal on the exterior of said lamp bulb connected with said lead-in wire, and means for passing a solution through said bulb in contact with said supporting structure and the tungsten and lead-in wires.

6. An electrode for determining or utilizing hydrogen ion concentrations comprising the material tungsten.

7. An electrode for determining or utilizing hydrogen ion concentrations comprising the material tungsten in the form of a wire or filament.

8. An electrode for determining or utilizing hydrogen ion concentrations comprising tungsten having a surface of the character of a tungsten incandescent lamp filament.

9. An electrode for determining or utilizing hydrogen ion concentrations comprising tungsten wire having a surface of the character of a tungsten incandescent lamp filament.

10. In apparatus for determining or utilizing hydrogen ion concentration, an electrode comprising the material tungsten for association with a solution the concentration of whose hydrogen ions is to be determined or utilized.

JOHN R. BAYLIS.